United States Patent
Mullins (10) Patent No.: US 10,119,353 B2
(45) Date of Patent: Nov. 6, 2018

(54) PASSIVELY LOCKING CONNECTOR (71) Applicant: FMC TECHNOLOGIES, INC., Houston, TX (US)

(72) Inventor: Chance R. Mullins, Spring, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 15/528,634

(22) PCT Filed: Dec. 16, 2015

(86) PCT No.: PCT/US2015/065973
§ 371 (c)(1),
(2) Date: May 22, 2017

(87) PCT Pub. No.: WO2017/105427
PCT Pub. Date: Jun. 22, 2017

(65) Prior Publication Data
US 2018/0038184 A1 Feb. 8, 2018

(51) Int. Cl.
*E21B 33/038* (2006.01)
*E21B 43/013* (2006.01)

(52) U.S. Cl.
CPC .......... *E21B 33/038* (2013.01); *E21B 43/013* (2013.01)

(58) Field of Classification Search
CPC .............................. E21B 33/038; E21B 43/013
See application file for complete search history.

(56) References Cited

U.S. PATENT DOCUMENTS

| 3,028,179 | A | | 4/1962 | Abramoska |
| 3,071,188 | A | | 1/1963 | Raulins |
| 3,228,715 | A | * | 1/1966 | Neilon ................ E21B 33/038 285/313 |
| 3,454,047 | A | | 7/1969 | Johnston |
| 3,732,923 | A | | 5/1973 | Fowler |
| 3,884,448 | A | | 5/1975 | Millar et al. |

(Continued)

FOREIGN PATENT DOCUMENTS

| GB | 2033463 A | 5/1980 |
| GB | 2102522 A | 2/1983 |
| WO | 2014/035254 A1 | 3/2014 |

OTHER PUBLICATIONS

International Search Report and Written Opinion dated Aug. 29, 2015 for PCT/US2015/065973 filed on Dec. 16, 2015.

*Primary Examiner* — Matthew R Buck
*Assistant Examiner* — Aaron L Lembo
(74) *Attorney, Agent, or Firm* — Amerson Law Firm, PLLC (57) ABSTRACT

An assembly includes a first hub having a body and an end surface, first and second openings defined in the body and a plurality of segmented collets positioned around the body. A locking mandrel is operatively coupled to the body, wherein the locking mandrel is adapted to engage the plurality of segmented collets, and a latching/release mechanism is positioned at least partially within the first and second openings defined in the body, wherein the latching/release mechanism is adapted to be positioned in a first position wherein the locking mandrel is in an unlocked and loaded position and in a second position wherein the locking mandrel is released and engages the plurality of segmented collets so as to couple the first hub to a second hub.

16 Claims, 8 Drawing Sheets

(56) References Cited

U.S. PATENT DOCUMENTS

| | | | | |
|---|---|---|---|---|
| 4,057,267 A | * | 11/1977 | Jansen, Jr. | E21B 33/038 285/18 |
| 4,526,406 A | * | 7/1985 | Nelson | E21B 33/038 285/18 |
| 5,282,655 A | | 2/1994 | Marietta | |
| 6,142,233 A | * | 11/2000 | Wilkins | E21B 33/038 166/339 |
| 6,474,696 B1 | | 11/2002 | Canale | |
| 2005/0146137 A1 | | 7/2005 | Davidson et al. | |
| 2014/0318909 A1 | | 10/2014 | Bakke | |
| 2017/0328164 A1 | * | 11/2017 | Partridge | E21B 33/038 |

* cited by examiner

PASSIVELY LOCKING CONNECTOR

FIELD OF INVENTION

The present invention relates to risers that may be used in the oil and gas industry and, more particularly, to a unique passively locking connector with a delayed release-latching mechanism.

BACKGROUND OF THE INVENTION

In drilling, completing and operating subsea oil and gas wells a sealing connection must be established between two hubs. In general, this may be accomplished by use of a connector that contains a locking means for clamping the two hubs together so as to establish the seal between the two hubs. The structures and configurations of the hubs and the connector, as well as the mechanisms used to establish the sealing connection between such hubs is vast and varied. As one example, in the oil and gas industry, subsea wells normally have a large tubular wellhead positioned at the sea floor. A component such as a Christmas tree or a blowout preventer is that is coupled to the wellhead (or another component) via the connection between two such hubs. Typically, a wellhead connector is attached to a first component that contains a first hub that is adapted to be coupled to the wellhead (a second hub) by the use of a hydraulically actuated connector. Typically, the sealing connection between the two hubs is established by actuating one or more hydraulic cylinders to force "dogs" into engagement with a profile (e.g., grooves) formed in the outer surface of the wellhead. Another example from the oil and gas industry is subsea flow lines wherein connections must be made between two tubular shaped flow lines that carry hydrocarbon fluids and gases. The hubs may be part of any of a variety of different types of equipment or structures, e.g., Christmas trees, a subsea well head, a subsea jumper, a manifold, a pipeline, a flow line, a Pipeline End Module (PLEM), a Pipeline End Termination (PLET), etc.

In general, a first component, e.g., a manifold, is located on the sea floor. The manifold contains a first hub that is adapted to be coupled to a second hub on second piece of equipment, such as a subsea jumper that will be lowered toward the subsea floor using a crane that is positioned on surface vessel. In general, alignment means are provide to approximately align the two hubs as the second component nears the first component on the sea floor. One example of such alignment means includes an upstanding rod positioned proximate the first hub and a downward facing funnel shaped device that is attached to the second hub. As the second piece of equipment nears the first piece of equipment, the funnel engages the upstanding rod to approximately align the two hubs relative to one another. While all of this positioning and alignment is occurring, the vessel at the surface is subjected to the wave conditions at the surface of the body of water. Thus, the second piece of equipment, even after alignment with the funnel device, may still heave upward and downward as the vessel at the surface experiences the surface wave conditions. In practice, once the rod and funnel are properly engaged, and the two hubs are separated by a small distance, e.g., 5-20 inches (12.7-50.80 cm), the second component may simply be dropped onto the first component, i.e., the second hub is dropped on the first hub.

This dropping is problematic for several reasons. First, there is the risk of damaging the sealing surfaces on the two hubs if there is any misalignment between the two hubs. Second, the hubs are normally sealed together using a metal seal ring that is typically positioned in the second hub of the second component as the second component is lowered toward the see floor. If the second component is simply dropped on the first component, the metal seal ring may be damaged thereby preventing the establishment of a proper seal between the two hubs.

The present application is directed to a unique passively locking connector with a delayed release-latching mechanism that may eliminate or at least minimize some of the problems noted above.

BRIEF DESCRIPTION OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present application is generally directed to a passively locking connector with a delayed latching/release mechanism. In one illustrative embodiment, an assembly is disclosed that includes a first hub having a body and an end surface, first and second openings defined in the body, and a plurality of segmented collets positioned around the body. The disclosed assembly also includes a locking mandrel that is operatively coupled to the body, the locking mandrel being adapted to engage the plurality of segmented collets, and a latching/release mechanism that is positioned at least partially within the first and second openings defined in the body, the latching/release mechanism being adapted to be positioned in a first position wherein the locking mandrel is in an unlocked and loaded position and in a second position wherein the locking mandrel is released and engages the plurality of segmented collets so as to couple the first hub to a second hub. The latching/release mechanism includes, among other things, a latch positioned in the second opening and a boss positioned in the first opening, the boss being adapted to be moveable from a first locked boss position wherein the latch engages the boss and the locking mandrel so as to restrain the locking mandrel in the unlocked and loaded position to a second unlocked boss position wherein a profile on the latch engages a release profile defined in the boss and the latch is released from engagement with the locking mandrel. Additionally, the latching/release mechanism further includes an exhaust port defined in the body that provides fluid communication between an upper region of the first opening above an upper surface of the boss and an outer surface of the body, wherein the exhaust port is adapted to allow fluid in the upper region to flow out of the exhaust port as the boss moves from the first locked position to the second unlocked position within the first opening.

In another exemplary embodiment of the present disclosure, an assembly includes a first hub having a body and an end surface, first and second openings defined in the body, a plurality of segmented collets positioned around the body, and a locking mandrel that is operatively coupled to the body, the locking mandrel being adapted to engage the plurality of segmented collets. Additionally, the exemplary assembly further includes a latching/release mechanism that is positioned at least partially within the first and second openings defined in the body, the latching/release mechanism being adapted to be positioned in a first position wherein the locking mandrel is in an unlocked and loaded position and in a second position wherein the locking mandrel is released and engages the plurality of segmented collets so as to couple the first hub to a second hub. The disclosed assembly also includes, among other things, a latch positioned in the second opening and a boss positioned in the first opening, wherein the boss includes a recess defined in the boss, the recess having an upper surface, and a rod is positioned in the first opening wherein a portion of the rod is positioned within the recess in the boss, the rod having a shoulder. Furthermore, a contact spring is positioned within the first opening between the shoulder and a bottom surface of the boss, and a resistance spring is positioned within the first opening between an upper surface of the boss and an upper surface of the first opening.

Also disclosed herein is another illustrative assembly that includes, among other things, a hub having a body and an end surface, first and second openings defined in the body, a plurality of segmented collets positioned around the body, a spring loaded locking mandrel that is operatively coupled to the body, the locking mandrel being adapted to engage the plurality of segmented collets. The illustrative assembly further includes and a latch that is at least partially positioned in the second opening, the latch being adapted to engage and restrain the locking mandrel in an unlocked and loaded position and having a latching profile. Additionally, a boss is positioned in the first opening, the boss having a boss body and a release profile defined in the boss body, wherein the latching profile is adapted to engage the boss body so as to maintain the locking mandrel in the unlocked and loaded positon and to engage the release profile so as to release the locking mandrel from the restrained unlocked and loaded position. Furthermore, an exhaust port is defined in the body that provides fluid communication between an upper region of the first opening above the boss and an outer surface of the body that is adapted to allow fluid in the upper region to flow out of the exhaust port.

BRIEF DESCRIPTION OF THE DRAWINGS

The present invention will be described with the accompanying drawings, which represent a schematic but not limiting its scope.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The basic structure of the novel connector 10 disclosed herein will be described with reference to FIG. 1 and FIGS. 2A-2C. Thereafter, the operational sequence wherein the connector 10 is used to couple a first hub 12 to a second hub 14 will be described with reference to FIGS. 2A-2C, FIGS. 3A-3B and FIGS. 4A-4B.

Figure 4A:
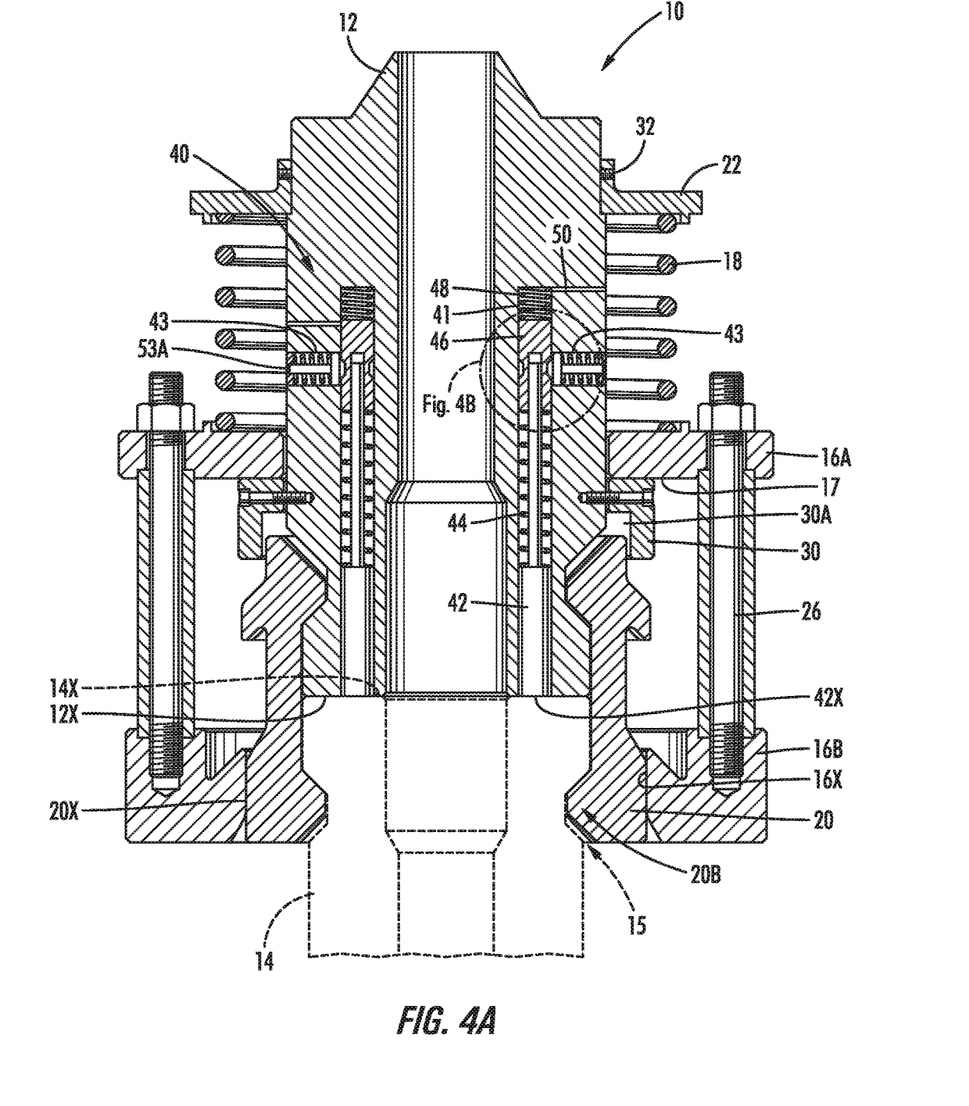
FIGS. 4A-4B depicts various cross-sectional views of the illustrative embodiment of the connector disclosed herein after a connection with another component has been established.

With reference to FIG. 1 and FIGS. 2A-2C, the connector 10 is adapted to couple a first hub 12 to a second hub 14. The hubs 12, 14 have end faces 12X and 14X, respectively. The first and second hubs 12, 14 are intended to be representative of hubs (of whatever shape or configuration) that are to be coupled to one another so as to thereby establish as seal between the two hubs 12, 14. The hubs 12, 14 may be part of any of a variety of different types of equipment or structures, e.g., Christmas trees, a subsea well head, a subsea jumper, a manifold, a pipeline, a flow line, a Pipeline End Module (PLEM), a Pipeline End Termination (PLET), etc. In general, the connector 10 disclosed herein provides a latching/release mechanism 40 that is adapted to restrain a locking mandrel 16 in an unlocked position (shown in FIG. 2A) and to release the locking mandrel 16 after the end surface 12X of the hub 12 engages the end surface 14X of the mating hub 14 so as to thereby sealingly engage the two components 12, 14 to one another, as shown in FIG. 4A. The hubs 12, 14 may be of any physical size and they may be oriented in any direction relative to one another, i.e., the hub 12 may be positioned vertically above the hub 14. Typically, a metal seal ring (not shown) is provided to establish a seal between the two hubs 12, 14 in an area immediately adjacent the interface between the surfaces 12X, 14X. Normally, the seal ring is positioned in the hub that is lowered toward the sea floor, e.g., the hub 12, and the equipment that includes the hub 12 is lowered into the water such that the hub 12 engages the hub 14 on the equipment that is positioned subsea.

With reference to FIGS. 1 and 2A-2C, the connector 10 includes a plurality of segmented collets 20 that are positioned around the outer perimeter of the body 12A of the hub 12. The number and exact physical configuration of such collets 20 may vary depending upon the particular application. The hub 12 has a locking profile 13 that is adapted to engage a profile 20A on the segmented collets 20, while the hub 14 has a locking profile 15 that is adapted to engage a locking profile 20B on the segmented collets 20. The locking profiles on the hubs 12, 14 and the segmented collets 20 may be of any desired configuration.

The connector 10 also comprises means for locking the hubs 12, 14 to one another. In the depicted example, this means for locking the two hubs 12, 14 to one another takes the form of a locking mandrel 16 that is comprised of an upper ring 16A and a collet engaging ring 16B. The upper ring 16A and the collet engaging ring 16B are coupled to one another via a plurality of threaded fasteners 26, e.g., threaded bolts and nuts. Of course, the upper ring 16A and the lower ring 16B may be operatively coupled to one another using any of a variety of techniques, i.e., the threaded fasteners 26 are simply one illustrative example on how they may be coupled together. The rings 16A, 16B may be one piece rings (as shown) or they may be comprised of multiple ring segments. The connector 10 further comprises a load reaction member 22 that is coupled to the body 12A by a plurality of fasteners 32, e.g., threaded bolts and a stop ring 30. The load reaction member 22 is coupled to the body 12A by a plurality of threaded fasteners 32. A connector drive spring 18 is positioned around the body 12A. In one illustrative embodiment, the connector drive spring 18 may be a single spring (as depicted) or several individual springs (not shown) may be positioned around the perimeter of the body 12A. As described more fully below, the connector drive spring 18 is initially compressed prior to the hubs 12, 14 being positioned proximate one another. In one illustrative example, the connector 10 may be assembled on a vessel on the surface of a body of water, wherein the connector drive spring 18 is positioned in it restrained, loaded position depicted in FIG. 2A. Once the connector drive spring 18 is released, it drives the collet engaging ring 16B of the locking mandrel 16 into engagement with collets 20 thereby sealingly coupling the first and second hubs 12, 14 to one another, as shown in FIG. 4A.

Figure 1:
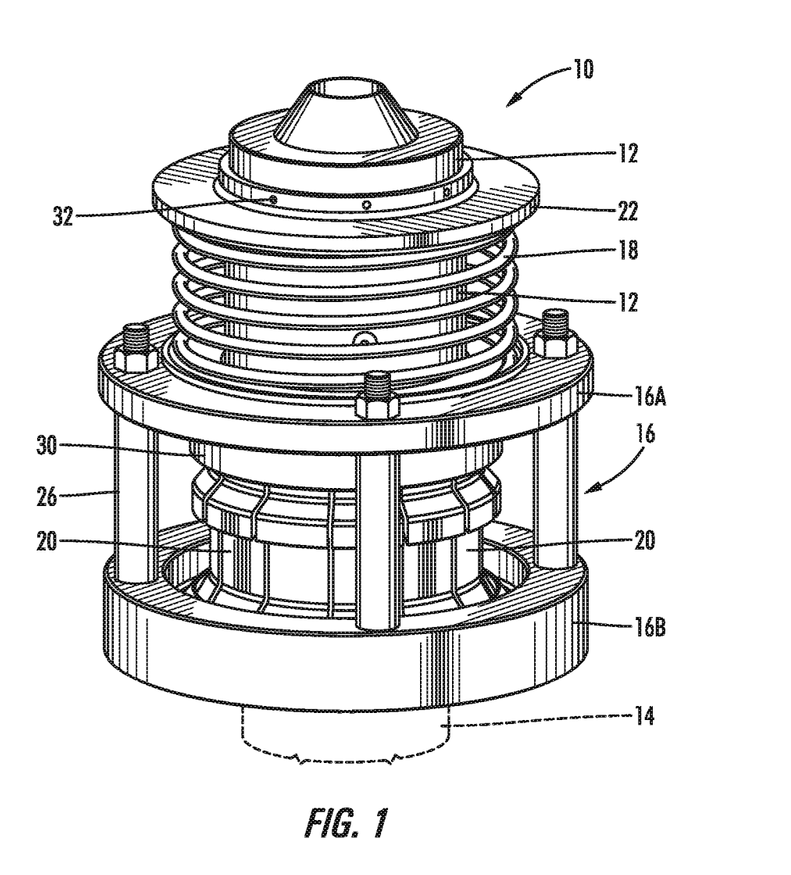
FIG. 1 is a perspective view of one illustrative embodiment of the connector disclosed herein.
Figure 2A:
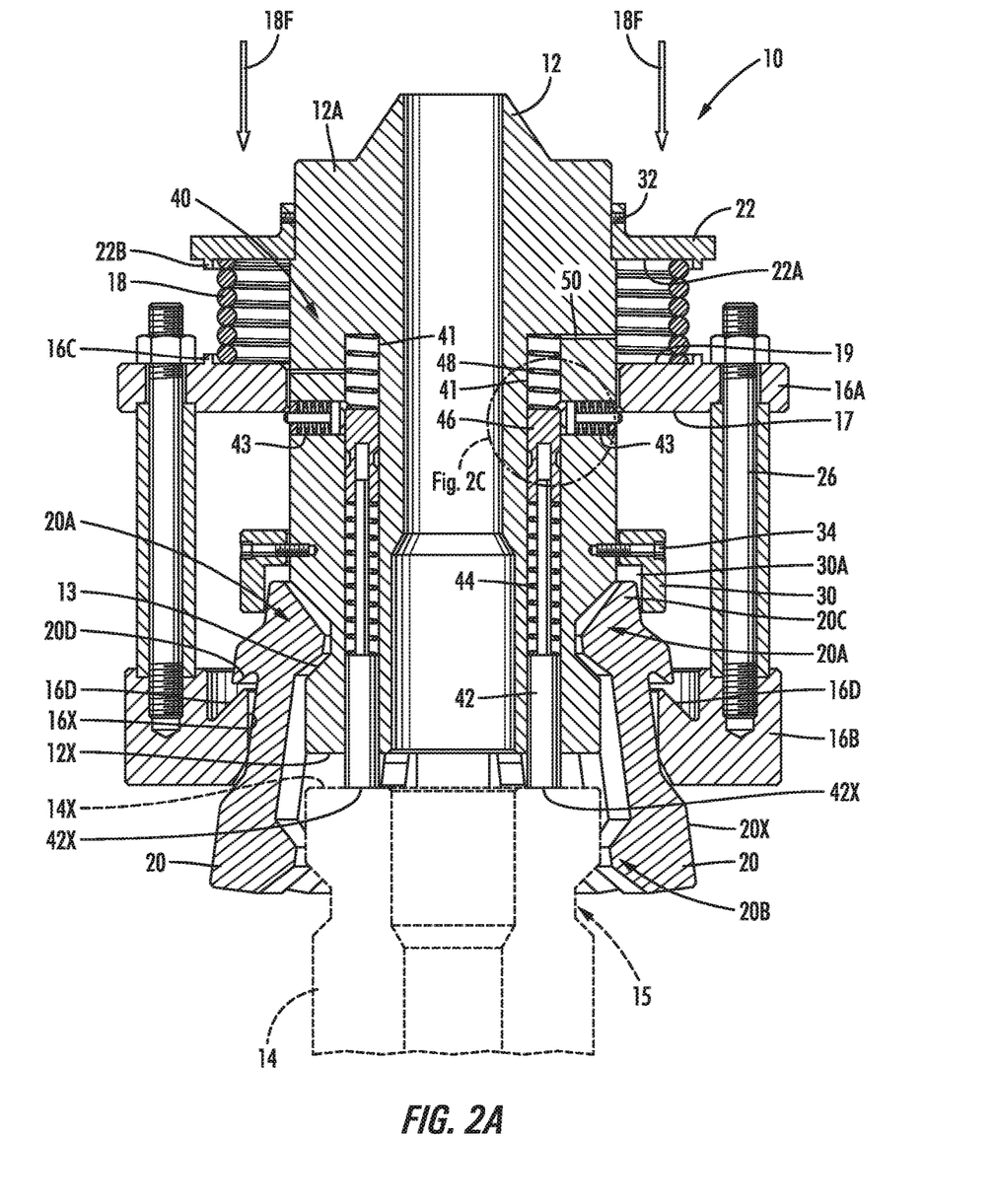
FIGS. 2A-2C depicts various cross-sectional views of one illustrative embodiment of the connector disclosed herein at a certain point in the process of establishing a connection with another component.

FIG. 2A depicts the connector 10 at a point wherein the hub 12 is positioned above the hub 14 but the surfaces 12X, 14X are spaced apart from one another. In the position shown in FIG. 2A, the connector 10 is in an unlocked, loaded position wherein the drive spring 18 is in a compressed state. Additionally, at this point, the collet members 20 are retained in a pre-engagement position wherein, via the interaction between the collet members 20, the load reaction member 30 and the collet engaging ring 16B, the collet members 20 are tilted in an outwardly, none-engaged position with respect to at least the engagement between the locking profile 15 on the hub 14 that is adapted to engage the locking profile 20B on the segmented collets 20. As depicted, an upper portion 20C of the segmented collets 20 is retained or trapped within a recess 30A defined between the load reaction member 30 and the outer surface of body 12A of the hub 12 by the collet engaging ring 16B. It should also be noted that, with reference to FIG. 2B, the surface 16D of the collet engaging ring 16B may engage the surface 20D of the segmented collets 20 so as to maintain the collet fingers 20 in the non-engaged position with respect to the hub 14.

As depicted, a retaining lip 22B on the load reaction member 22 and a retaining lip 16C on the upper ring 16A are provided to insure that the connector drive spring 18 remains in the desired position. The physical size, spring constant and materials of construction for the connector drive spring 18 may vary depending upon the particular application. In one illustrative embodiment where a single connector drive spring 18 is employed, it may have a relaxed axial length of about 34 inches (86.36 cm) and a spring constant of about 1000-1250 lb/in (175-218.75 N/mm). Of course, the size of the drive spring 18 is entirely dependent upon the size of the connector and these details will vary accordingly.

The connector 10 also comprises a plurality of latch/release mechanisms 40 that are generally positioned within the body 12A of the hub 12. The number of latch/release mechanisms 40 employed on a connector 10 may vary depending upon the particular application. In one example, the connector 10 may comprise four of the latch/release mechanisms 40 that are spaced 90° apart around the circumference of the body 12A. A first cylindrical opening 41 and a second cylindrical opening 43 are defined in the body 12A so as to house the latch/release mechanism 40. In one illustrative embodiment, the first opening 41 extends vertically within the body 12A from the end surface 12X of the hub 12 to its upper surface 41A. In one illustrative embodiment, the second opening 43 extends radially inward from the outer surface 12S of the body 12A and is positioned such that the second opening 43 intersects the first opening 41. The physical size of the first and second opening 41, 43 may vary depending upon the particular application and their diameters need not be the same, although such a configuration may be employed if desired. The axial length of the openings 41, 43 may also vary depending upon the particular application. In one illustrative embodiment, the axial length of the openings 41, 43 may be on the order of about 4 inches (10.16 cm) and about 3 inches (7.62 cm), respectively.

The latch/release mechanism 40 comprises a plurality of components that are positioned (at least partially) within the first opening 41. More specifically, latch/release mechanism 40 comprises a contacting rod 42, a contact spring 44, a boss 46 and a resistance spring 48. The contacting rod 42 may be retained within the opening 41 using any of a variety of known techniques. In one illustrative embodiment, the contacting rod 42 may be retained within the opening 41 by a collar/flange (not shown) that is coupled to the surface 12X using a plurality of fasteners (not shown). The physical size of these components may vary depending upon the particular application. In the depicted example, the contacting rod 42 is a dual-diameter configuration, i.e., having a first lower portion 42A and a second upper portion 42B, wherein the first portion has a larger diameter than of the second portion 42B. The lower portion 42A of the rod 42 is adapted to be positioned within first opening 41 in such a manner so that the rod 42 will slide within the first opening 41. In one illustrative embodiment, the diameter of the first portion 42A may be on the order of about 1.5 inches (3.81 cm) while the diameter of the second portion 42B may be about 0.75 inches (1.91 cm). The axial length of the first portion 42A and the second portion 42B may also vary depending upon the particular application. In one illustrative embodiment, the axial length of the rod portions 42A, 42B may be on the order of about 6 inches (15.24 cm) and about 10 inches (25.40 cm), respectively. The rod 42 has a lower contact surface 42X that is adapted to engage and contact the upper surface 14X of the hub 14. An upper part of the portion 42B of the rod 42 is adapted to be positioned within a cavity or recess 46C defined in the boss 46 in such a manner so that the portion 42B will slide within the recess 46C. The rod 42 also has an upper surface 42Y.

The boss 46 is also adapted to slide within the opening 41 during certain operational conditions to be discussed more fully below. The boss 46 comprises a lower surface 46A, an upper surface 46B, a recess 46C with an upper surface 46D and a profile 46E defined in the body of the boss 46. As depicted, the contact spring 44 is positioned around the reduced diameter portion 42B of the rod 42 between the shoulder 42S on the rod 42 and the bottom surface 46A of the boss 46. The resistance spring 48 is positioned between the upper surface 46B of the boss 46 and the upper surface 41A of the first opening 41 within a region of the opening 41 referenced with the number 49. An exhaust line 50 is defined in the body 12A of the hub 12 and establishes fluid communication between the region 49 of the opening 41 and that outer surface 12S of the body 12A. The diameter of the exhaust line 50 may vary depending upon the particular application, e.g., 1/16"-1/4" (0.16-0.64 cm). In the depicted example, only a single exhaust line 50 is depicted for communicating with the region 49. However, if desired, more than one such exhaust line may be employed. The physical size, spring constant and materials of construction for the contact spring 44 and the resistance spring 48 may vary depending upon the particular application. By way of example only, in one illustrative embodiment, the contact spring 44 it may have a relaxed axial length of about 8 inches (20.32 cm) and a spring constant of about 250-300 lb/in (43.75-52.50 N/mm), while the resistance spring 48 may have a relaxed axial length of about 4 inches (10.16 cm) and a spring constant of about 300-350 lb/in (52.50-61.25 N/mm). In general, the spring constant of the contact spring 44 will be less than the spring constant of the resistance spring 48 and the amount of compression of the axial length of the contact spring 44 will be greater than the amount of compression of the axial length of the resistance spring 48, i.e., there will be more "travel" on the spring 44 than on the spring 48.

Figure 2B:
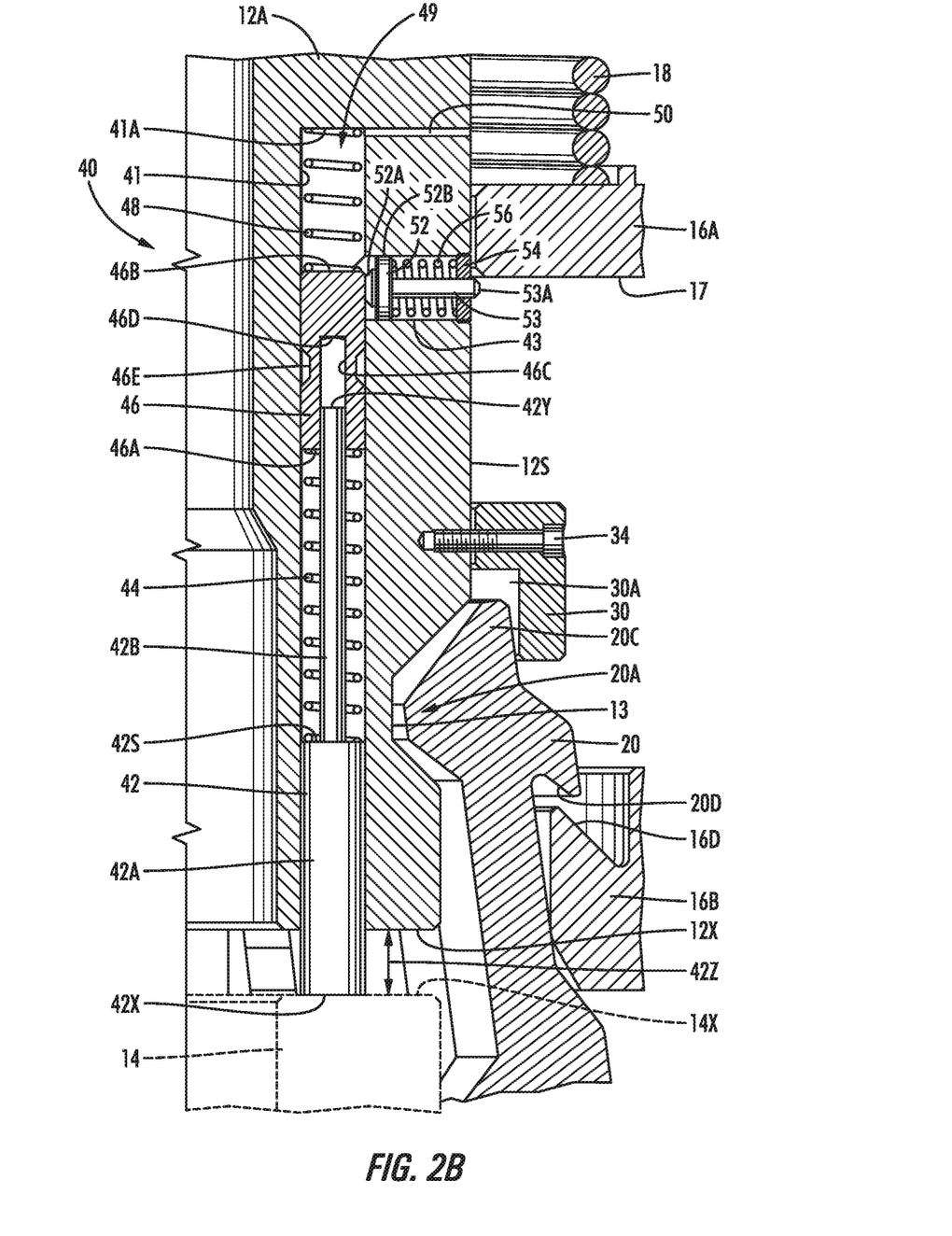
Figure 2C:
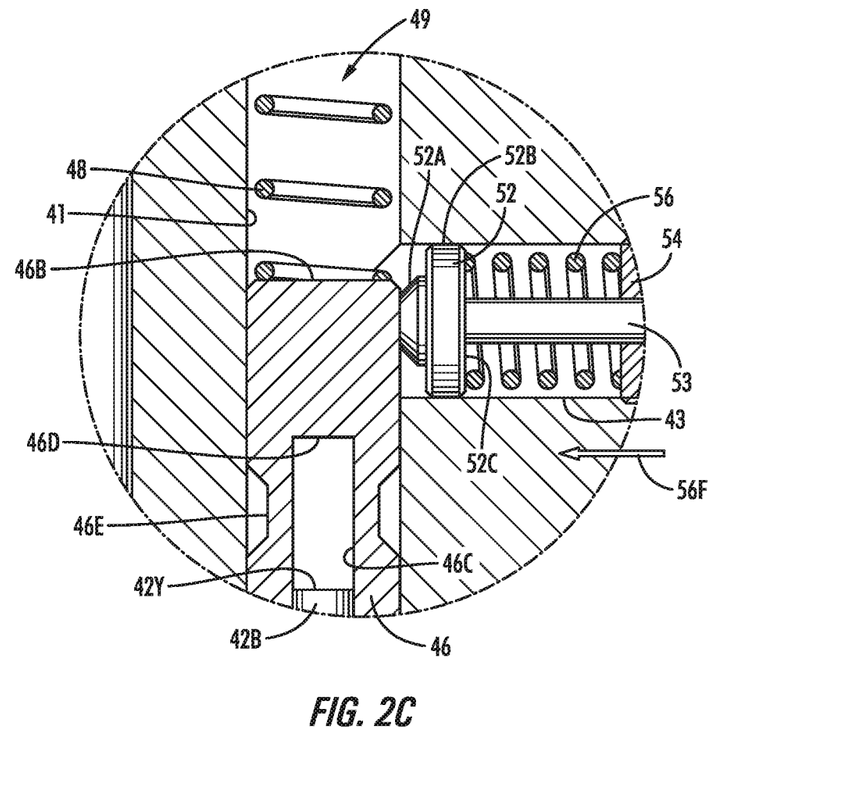

The latch/release mechanism 40 also comprises a plurality of components that are positioned (at least partially) within the second opening 43. More specifically, latch/release mechanism 40 comprises a latch 52, a latch spring 56 and a latch retainer plate 54. The latch retaining member 54 may be secured to the body 12A by a plurality of fasteners (not shown). The latch 52 comprises a latch profile 52A that is adapted to be positioned within the profile 46E defined in the boss 46 and a rod 53. The rod 53 has an end surface 53A. The latch retainer plate 54 has an opening defined therein that allows a portion of the rod 53 to extend therethrough. As described more fully below, in one operational position, the end surface 53A of the rod 53 extends beyond the outer surface 12S of the body 12A such that the rod 53 engages a bottom surface 17 of the upper ring 16A of the locking mandrel 16. The physical size of these components may vary depending upon the particular application. A portion of the latch 52 is adapted to be positioned within second opening 43 in such a manner so that the latch 52 will slide within the second opening 43 while there is contact between the surface 53B and the inside of the opening 43. In one illustrative embodiment, the latch spring 56 may have a relaxed axial length of about 3 inches (7.63 cm) and a spring constant of about 25-50 lb/in (4.38-8.75 N/mm), while the diameter of the rod 53 may fall within the range of about 1.25-1.5 inches (3.18-3.81 cm). As depicted in FIGS. 2A-2C, the latch profile 52A is adapted to engage the outer surface of the boss 46. The latch spring 56 is positioned around the rod 53 between the bottom surface 52C and the latch retainer plate 54.

One illustrative operational sequence wherein the connector 10 is used to sealingly couple the first hub 12 to the second hub 14 will be described with reference to FIGS. 2A-2C, FIGS. 3A-3B and FIGS. 4A-4B. In general, the connector 10 may be installed around the hub 12 on a vessel or in a manufacturing shop. At some point, the connector 10 may be arranged in the position depicted in FIGS. 2A-2C wherein the connector drive spring 18 is compressed, the rod 53 of the latch 52 engages the bottom surface 17 of the upper ring 16A of the locking mandrel 16 and the collet fingers 20 are maintained in their outwardly-flared position, as shown in FIG. 2A. An externally operated hydraulically powered tool may be used to compress the connector drive spring 18. At this point, the surface 16D of the collet engaging ring 16B may be engaged with the surface 20D of the segmented collets 20 so as to maintain the collet fingers 20 in the non-engaged position with respect to the hub 14.

In the position shown in FIG. 2A, the latch 52 and the compressed latch spring 56 are retained within the opening 43 by the latch retainer plate 54. The compressed latch spring 56 applies a lateral force 56F (see FIG. 2C) that urges the profile 52A of the latch 52 into engagement with the outer surface of the boss 46. Also note that, as shown in FIG. 2A, with the connector drive spring 18 in the compressed, restrained position, the rod 42 is positioned within the first opening 41 such that the contact end 42X of the rod 42 extends beyond the surface 12X of the hub 12 by a distance 42Z that falls within the range of about 1.5-2.0 inches (3.81-5.08 cm), which may vary depending upon the particular application. The rod 42 is in this extended position (with the end of the rod extending the distance 42Z beyond the end surface 12X of the hub 12) as the equipment that includes the hub 12 is lowered toward the sea floor. The resistance spring 48 and the contact spring 48 are slightly energized (i.e. partially compressed) at this point so as to insure that the rod 42 remains in this extended position as the equipment is lowered toward the sea floor.

The components of the connector 10 are dimensioned such that the engagement between the profile 52A on the latch 52 and the body of the boss 46 forces the rod 53 of the latch 52 out past the outer surface 12S of the body 12A such that rod 53 is engaged with the bottom surface 17 of the upper ring 16A of the locking mandrel 16. This engagement between the rod 53 and the bottom surface 17 of the upper ring 16A prevents downward movement of the locking mandrel 16. Also note that the distance between the upper end surface 42Y of the rod 42 and the upper surface 46D of the recess 46C in the boss 46 is less than the distance 42Z between the contact end 42X of the rod 42 and the end surface 12X of the hub 12. In one illustrative embodiment, in the positon depicted in FIG. 2A, the contact spring 44 may be in a partially compressed state. In the position shown in FIGS. 2A-2C, the connector 10 is in what can be referred to as an "unlocked and loaded" position, wherein the connector drive spring 18 is fully loaded (i.e., compressed), thus applying a downward force 18F to the locking mandrel 16, and the locking mandrel 16 is prevented from moving downward by virtue of the engagement between the rod 53 of the latch 52 and the upper ring 16A. In this unlocked and loaded position the end 42X of the rod 42 projects beyond the end surface 12X of the hub 12 by the distance 42Z.

With the connector 10 in the unlocked and loaded position, the equipment that includes the hub 12, such as a subsea jumper or flow line, is lowered into the water and descends toward the sea floor. As the connector 10 is lowered into the water, the openings 41 and 43 fill with water, including the region 49 within the opening 41 above the boss 46. Water may flow into the openings 41, 43 via the exhaust line 50 as the connector 10 is lowered into the water. Note that, in the depicted embodiment, seals, e.g., o-ring seals or the like, are not provided between the boss 46 and the opening 41 or between the portion 42A of the rod 42 and the opening 41. However, if desired, such seals may be added. FIGS. 2A-2C depict the connector 10 at a point in time where the end surface 42X of the rod 42 has just made contact with the end surface 14X of the hub 14. At this point the connector 10 remains in the unlocked and loaded position.

Figure 3A:
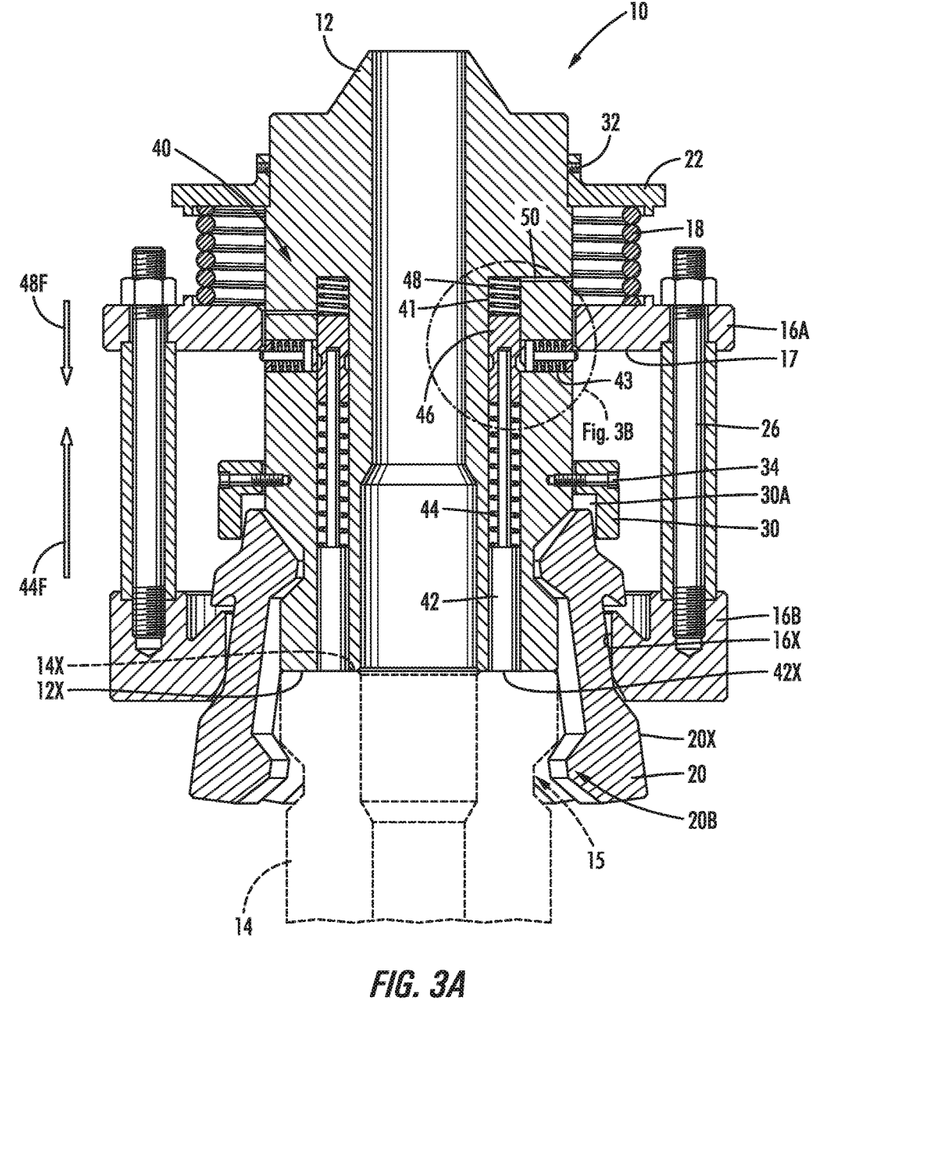
FIGS. 3A-3B depicts various cross-sectional views of the illustrative embodiment of the connector disclosed herein at another point in the process of establishing a connection with another component.
Figure 3B:
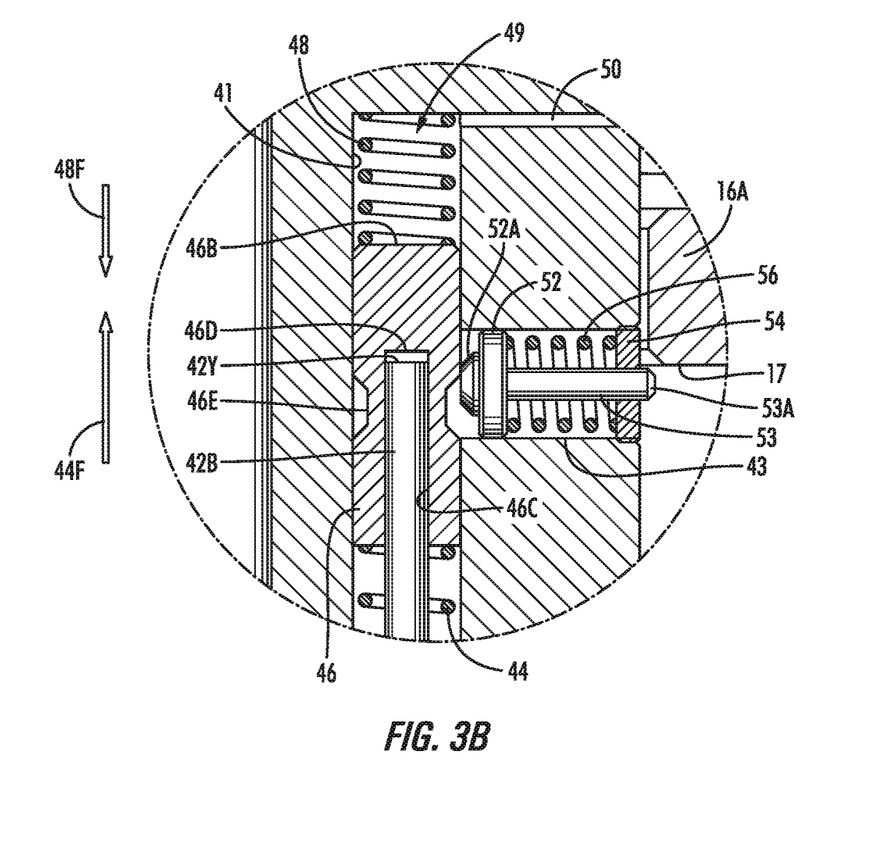

FIGS. 3A-3B depict the connector at a point wherein the hub 12 has been lowered such that the surface 12X of the hub 12 contacts the surface 14X of the hub 14. As a result of the lowering of the hub 12 into the depicted position, the rod 42 is driven upward within the opening 41 so as to compress at least the contact spring 44 and create a spring force 44F that tends to drive the boss 46 upward within the opening 41. Note that, as shown in FIG. 3B, even when the contact end 42X of the rod 42 is fully retracted within the body 12A, the upper end surface 42Y of the rod 42 may not contact the upper surface 46D of the recess 46C in the boss 46. That is, the force that is driving the boss 46 upward is the spring force 44F created by compression of the contact spring 44 when the rod 42 is driven up into the opening 41 by virtue of the contact between the end surface 42X and the surface 14X of the hub 14 as the component containing the hub 12 is lowered so as to cause engagement between the hubs 12, 14. During this process, the boss 46 may also move upward within the opening 41 (as best shown in FIG. 3B) thereby compressing the resistance spring 48 and creating a downward directed spring force 48F. The component parts have mechanical tolerances that insure that the rod 42 will preferentially move or slide within the recess 46C in the boss 46 and not simply drag on the inner surface of the recess 46C. As the boss 46 moves upward within the opening 41, water within the region 49 (i.e., above the boss 46) is discharged from the region 49 via the exhaust line 50 (and perhaps other vent lines in fluid communication with the region 49) and into, in one embodiment, the subsea environment. Note that, in FIGS. 3A-3B, although the boss 46 has moved upward within the opening 41 as compared to where it was in FIG. 2A, the boss 46 is still in a position where the profile 52A on the latch 52 is still prevented from engaging the profile 46E on the boss 46, i.e., the connector drive spring 18 is still compressed and the locking mandrel 16 is prevented from moving downward by the engagement of the rod 53 with the bottom surface 17 of the upper ring 16A.

Figure 4B:
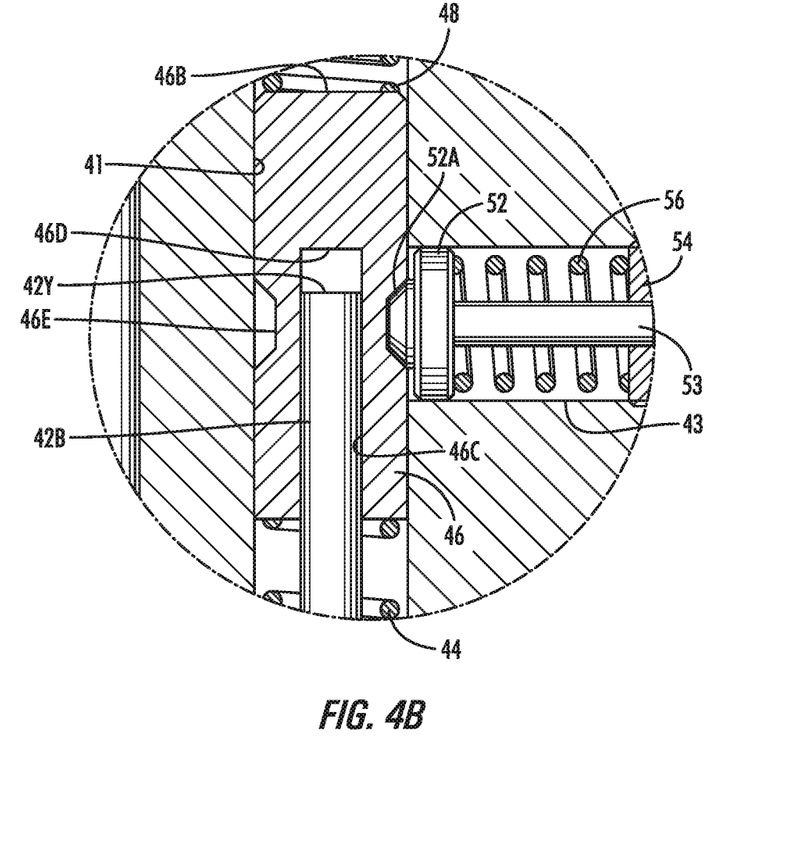

FIGS. 4A-4B depicts the connector 10 in the fully engaged and locked position wherein the hubs 12, 14 are sealingly coupled to one another. In this position, the boss 46 has moved further upward within the opening 41 as compared to the position of the boss 46 shown in FIGS. 3A-3B, and additional water has been discharged from the region 49 above the boss 46 via the exhaust line 50. The additional upward movement of the boss 46 allows the profile 52A on the latch 52 (which is biased to engage the boss 46 via latch spring 56) to engage the profile 46E on the boss 46. The engagement between the two profiles 52A, 46E, allows the latch 52 to move radially inward within the opening 43 and disengages the rod 53 from the bottom surface 17 of the upper ring 16A of the locking mandrel 16. As a result, the connector drive spring 18 is released and the locking mandrel 16 is driven downward so as to force the locking profile 20B on the collets segments 20 into engagement with the profile 15 on the hub 14 and thereby preload the connection between the hubs 12, 14. More specifically, a flat surface 16X on the lower ring 16B engages a corresponding flat surface 20X on the collet segments 20 thereby firmly driving the collets 20 into the engaged position. If it is ever desired to unlock the connector 10, an override tool (not shown) that is external to the connector 10 may be positioned subsea and the connector drive spring 18 may be compressed thereby causing the collet segments 20 to pivot to their unlocked position shown in FIG. 2A.

The novel connector 10 that includes the latch/release mechanism 40 disclosed herein provide several benefits as compared to prior art methods of establishing connections between subsea hubs 12, 14. After the end 42X of the rod 42 first makes contact with the surface 14X of the hub 14, the mechanism that was used to lower the equipment that comprises the hub 12 toward the sea floor, e.g., a crane, may be released from engagement with the equipment. At that point, the weight of the equipment will force the rod 42 upward within the opening 41. Upward movement of the rod 41 is resisted by several forces. First, upward movement of the boss 46 within the opening 41 is opposed by the force 48F generated by compression of the resistance spring 48 as the boss 46 moves upward within the opening 41. Second, the rate at which the boss 46 is allowed to move upward within the opening 41 is slowed by virtue of the relatively slow escape of water from the region 49 via the exhaust line 50. Additionally, the downward force created by compression of the contact spring 44 between the boss 46 and the shoulder 42S on the rod 42 will tend to resist upward movement of the rod 42 within the opening 41. The net effect of all of these interacting forces is that there is a time delay between the time (T1) when the end 42X of the rod 42 contacts the surface 14X of the hub 14 and time (T2) when the rod 42 is forced up into the opening 41 such that the end 42X of the rod 42 is substantially flush with the end 12X of the hub 12. Effectively, the delayed release mechanism disclosed herein results in the slow decent of the hub 12 into engagement with the hub 14, which is in contrast with some prior art techniques wherein the equipment containing the upper hub 12 was simply dropped the last few inches after the hubs 12, 14 were positioned adjacent one another. The amount of time between the times T1 and T2 may vary depending upon the particular application and factors such as the size and weight of the equipment that contains the hub 12, the size and number of the exhaust openings 50, etc. In one illustrative embodiment, this time difference (T2−T1) may be on the order of about 5-15 seconds.

Additionally, the structure and arrangement of the latch/release mechanism provides a delay between the contact of the hub 12, 14 and the release of the locking mandrel 16. Accordingly, the primary force driving the boss 46 upward within the opening 41 (ignoring any force produced by sliding contact between the rod portion 42B and the sidewalls of the recess 42C) is provided by the compressed contact spring 44 that is compressed between the bottom 46A of the boss 46 and the shoulder 42S on the rod 42. However, as noted above, vertical movement of the boss 46 within the opening 41 is resisted by the force 48F applied by the resistance spring 48 and the presence of water in the region 49 above the boss 46. Thus, even after the hubs 12, 14 contact one another, i.e., when the end surface 42X of the rod 42 is flush with the end surface 12X of the hub 12 at time T2, there is a delay in the movement of the boss 46 from the position shown in FIG. 2A where the latch rod 53 engages the ring 16 to the position of the boss shown in FIG. 3A where the latch profile 52A engages the profile 46E in the boss 46 and the locking mandrel 16 is released (time T3). Effectively, the delayed release mechanism disclosed herein results in the relatively slow upward movement of the boss 46 within the opening 41 after the hubs 12, 14 contact one another. The amount of time between the times T3 and T2 may vary depending upon the particular application and factors such as the size and weight of the equipment that contains the hub 12, the size and number of the exhaust openings 50, etc. In one illustrative embodiment, this time difference (T3−T2) may be on the order of about 5-15 seconds. This delay allow time for the hubs 12, 14 to be moved into engagement with one another at a relatively slow pace and delays the release of the locking mandrel 16 until such time as the hubs 12, 14 are properly positioned relative to one another. The delay is caused by the change in the available water volume in the opening 41 and the allowable rate of evacuation of water from the opening 41 via the relative small exhaust line 50.

As will be appreciated by those skilled in the art after a complete reading of the present application, in some embodiments of the inventions disclosed herein the opening 43 and the components positioned therein may be omitted and the hub may only be provided with the opening 41 and the components positioned therein. In this particular embodiment, the actuation of the locking mandrel 16 is not coupled to the movement of the rod within the opening 41. Additionally, although the latch/release mechanisms 40 are depicted as being positioned in the hub 12, in other embodiments, all or a portion of each of the latch/release mechanisms 40 may be positioned within the body of the hub 14.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. An assembly, comprising:
    a first hub comprising a body and an end surface;
    first and second openings defined in the body;
    a plurality of segmented collets positioned around the body;
    a locking mandrel that is operatively coupled to the body, the locking mandrel being adapted to engage the plurality of segmented collets; and
    a latching/release mechanism that is positioned at least partially within the first and second openings defined in the body, the latching/release mechanism being adapted to be positioned in a first position wherein the locking mandrel is in an unlocked and loaded position and in a second position wherein the locking mandrel is released and engages the plurality of segmented collets so as to couple the first hub to a second hub, wherein the latching/release mechanism comprises:
    a latch positioned in the second opening;
    a boss positioned in the first opening, the boss being adapted to be moveable from a first locked boss position wherein the latch engages the boss and the locking mandrel so as to restrain the locking mandrel in the unlocked and loaded position to a second unlocked boss position wherein a profile on the latch extends into the first opening and engages a recessed release profile defined in the boss and the latch is released from engagement with the locking mandrel; and
    an exhaust port defined in the body that provides fluid communication between an upper region of the first opening above an upper surface of the boss and an outer surface of the body wherein the exhaust port is adapted to allow fluid in the upper region to flow out of the exhaust port as the boss moves from the first locked position to the second unlocked position within the first opening.

2. The assembly of claim 1, wherein the first opening has central axis that is oriented substantially parallel to a central axis of the hub.

3. The assembly of claim 2, wherein the second opening has a central axis that is oriented substantially perpendicular to the central axis of the hub.

4. The assembly of claim 3, wherein the second opening intersects the first opening.

5. An assembly, comprising:
    a first hub comprising a body and an end surface;
    first and second openings defined in the body;
    a plurality of segmented collets positioned around the body;
    a locking mandrel that is operatively coupled to the body, the locking mandrel being adapted to engage the plurality of segmented collets;
    a latching/release mechanism that is positioned at least partially within the first and second openings defined in the body, the latching/release mechanism being adapted to be positioned in a first position wherein the locking mandrel is in an unlocked and loaded position and in a second position wherein the locking mandrel is released and engages the plurality of segmented collets so as to couple the first hub to a second hub;
    a latch positioned in the second opening;
    a boss positioned in the first opening, the boss comprising a recess defined in the boss, the recess having an upper surface;
    a rod positioned in the first opening wherein a portion of the rod is positioned within the recess in the boss, the rod comprising a shoulder;
    a contact spring positioned within the first opening between the shoulder and a bottom surface of the boss; and
    a resistance spring positioned within the first opening between an upper surface of the boss and an upper surface of the first opening.

6. The assembly of claim 5, wherein the latch further comprises a rod and a profile, the assembly further comprising:
- a latch spring positioned in the second opening, the latch spring being positioned around the rod; and
- a latch retaining plate that is removeably coupled to the body and engages the latch spring, the latch retaining plate comprising an opening that is adapted to receive the rod and wherein the latch spring is adapted to bias the profile against the boss.

7. The assembly of claim 5, wherein the contact spring has a spring constant that is greater than a spring constant of the resistance spring.

8. The assembly of claim 7, wherein the boss comprises a profile that is adapted to engage the profile of the latch so as to allow the latch to move within the second opening.

9. An assembly, comprising:
- a hub comprising a body and an end surface;
- first and second openings defined in the body;
- a plurality of segmented collets positioned around the body;
- a spring loaded locking mandrel that is operatively coupled to the body, the locking mandrel being adapted to engage the plurality of segmented collets;
- a latch that is at least partially positioned in the second opening, the latch adapted to engage and restrain the locking mandrel in an unlocked and loaded position, the latch comprising a latching profile;
- a boss positioned in the first opening, the boss comprising a boss body and a recessed release profile defined in the boss body, wherein the latching profile is adapted to engage the boss body so as to maintain the locking mandrel in the unlocked and loaded positon and to extend into the first opening and engage the recessed release profile so as to release the locking mandrel from the restrained unlocked and loaded position; and
- an exhaust port defined in the body that provides fluid communication between an upper region of the first opening above the boss and an outer surface of the body that is adapted to allow fluid in the upper region to flow out of the exhaust port.

10. The assembly of claim 9, further comprising:
- a rod positioned in the first opening wherein a portion of the rod is positioned within a recess defined in the boss, the rod comprising a shoulder;
- a contact spring positioned within the first opening between the shoulder and a bottom surface of the boss; and
- a resistance spring positioned within the first opening between an upper surface of the boss and an upper surface of the first opening.

11. The assembly of claim 9, wherein the latch further comprises a rod, the assembly further comprising:
- a latch spring positioned in the second opening, the latch spring being positioned around the rod; and
- a latch retaining plate that is removeably coupled to the body and engages the latch spring, the latch retaining plate comprising an opening that is adapted to receive the rod and wherein the latch spring is adapted to bias the latching profile against the boss.

12. The assembly of claim 10, wherein the contact spring has a spring constant that is greater than a spring constant of the resistance spring.

13. The assembly of claim 9, wherein the first opening has a central axis that is oriented substantially parallel to a central axis of the hub.

14. The assembly of claim 13, wherein the second opening has a central axis that is oriented substantially perpendicular to the central axis of the hub.

15. The assembly of claim 9, wherein the second opening intersects the first opening.

16. An assembly, comprising:
- a hub comprising a body and an end surface;
- first and second openings defined in the body, the second opening intersecting the first opening;
- a plurality of segmented collets positioned around the body;
- a spring loaded locking mandrel that is operatively coupled to the body, the locking mandrel being adapted to engage the plurality of segmented collets;
- a latch that is at least partially positioned in the second opening, the latch adapted to engage and restrain the locking mandrel in an unlocked and loaded position, the latch comprising a latching profile;
- a boss positioned in the first opening, the boss comprising a boss body and a release profile defined in the boss body, wherein the latching profile is adapted to engage the boss body so as to maintain the locking mandrel in the unlocked and loaded positon and to engage the release profile so as to release the locking mandrel from the restrained unlocked and loaded position;
- a rod positioned in the first opening wherein a portion of the rod is positioned within a recess defined in the boss, the rod comprising a shoulder;
- a contact spring positioned within the first opening between the shoulder and a bottom surface of the boss;
- a resistance spring positioned within the first opening between an upper surface of the boss and an upper surface of the first opening; and
- an exhaust port defined in the body that provides fluid communication between an upper region of the first opening above the boss and an outer surface of the body that is adapted to allow fluid in the upper region to flow out of the exhaust port.

* * * * *